(12) United States Patent
Blue, III et al.

(10) Patent No.: US 11,753,884 B2
(45) Date of Patent: Sep. 12, 2023

(54) DOWNHOLE CUTTINGS COLLECTOR

(71) Applicant: Halliburton Energy Services, Inc., Houston, TX (US)

(72) Inventors: Daniel Duncan Blue, III, Houston, TX (US); Ian David Campbell Mitchell, The Woodlands, TX (US)

(73) Assignee: Halliburton Energy Services, Inc., Houston, TX (US)

( * ) Notice: Subject to any disclaimer, the term of this patent is extended or adjusted under 35 U.S.C. 154(b) by 756 days.

(21) Appl. No.: 16/480,585

(22) PCT Filed: Apr. 2, 2019

(86) PCT No.: PCT/US2019/025314
§ 371 (c)(1),
(2) Date: Jul. 24, 2019

(87) PCT Pub. No.: WO2019/212670
PCT Pub. Date: Nov. 7, 2019

(65) Prior Publication Data
US 2021/0404272 A1    Dec. 30, 2021

Related U.S. Application Data

(60) Provisional application No. 62/664,704, filed on Apr. 30, 2018.

(51) Int. Cl.
*E21B 21/06*    (2006.01)
*B01D 33/044*   (2006.01)
(Continued)

(52) U.S. Cl.
CPC .......... *E21B 21/066* (2013.01); *B01D 33/044* (2013.01); *B65B 1/06* (2013.01);
(Continued)

(58) Field of Classification Search
CPC ....... B01D 33/044; B65C 3/06; G06T 7/0004; E21B 21/006–066
See application file for complete search history.

(56) References Cited

U.S. PATENT DOCUMENTS 3,135,685 A    6/1964  Tanner et al.
4,295,534 A *  10/1981 Zachmeier ............ E21B 21/065
                                              198/817

(Continued)

FOREIGN PATENT DOCUMENTS

FR    2966436 A1 *  4/2012 ............ A47F 10/06
WO    2015081266 A1  6/2015

OTHER PUBLICATIONS

English Translation of FR-2966436-A1 (Year: 2012).*
(Continued)

*Primary Examiner* — Alexander A Mercado
(74) *Attorney, Agent, or Firm* — DeLizio, Peacock, Lewin & Guerra, LLP (57) ABSTRACT

A system includes a flow line connected to a fluid and a suction line in fluid communication with the flow line, wherein the fluid is to carry cuttings from a borehole. The system also includes a flow line pump to move fluid via the suction line onto a surface of a cuttings separation conveyor, wherein the surface of the cuttings separation conveyor comprises a separation screen. The system also includes a cuttings container positioned to collect a portion of the cuttings from the separation conveyor.

18 Claims, 7 Drawing Sheets

(51) Int. Cl.
*B65B 1/06* (2006.01)
*B65B 43/52* (2006.01)
*B65C 3/16* (2006.01)
*G01N 15/02* (2006.01)
*B65C 3/06* (2006.01)
*G06T 7/00* (2017.01)

(52) U.S. Cl.
CPC ............... *B65B 43/52* (2013.01); *B65C 3/06* (2013.01); *B65C 3/16* (2013.01); *G01N 15/0227* (2013.01); *G06T 7/0004* (2013.01)

(56) References Cited

U.S. PATENT DOCUMENTS

| | | | | |
|---|---|---|---|---|
| 5,571,962 | A | * | 11/1996 | Georgi ................. E21B 21/065 175/46 |
| 5,718,298 | A | | 2/1998 | Rusnak |
| 6,386,026 | B1 | | 5/2002 | Zamfes |
| 9,410,387 | B1 | | 8/2016 | Gao |
| 9,920,623 | B1 | * | 3/2018 | Leeper ................... B65B 41/16 |
| 10,927,671 | B1 | * | 2/2021 | Tonner ................. E21B 21/066 |
| 11,293,241 | B2 | * | 4/2022 | Zazula ................. B01D 21/262 |
| 2010/0193249 | A1 | * | 8/2010 | Saiz ........................ E21B 21/06 175/207 |
| 2011/0277798 | A1 | | 11/2011 | Hillier |
| 2014/0166361 | A1 | | 6/2014 | Jamison et al. |
| 2016/0130928 | A1 | * | 5/2016 | Torrione ................. G01N 33/24 700/275 |
| 2016/0208568 | A1 | * | 7/2016 | Barnett ................. E21B 21/066 |
| 2017/0043965 | A1 | * | 2/2017 | Blaine ................. E21B 49/005 |
| 2017/0045491 | A1 | * | 2/2017 | Karoum ................. G01N 1/286 |
| 2017/0268303 | A1 | * | 9/2017 | Zazula ................. E21B 21/065 |
| 2018/0016875 | A1 | * | 1/2018 | Shokanov ............. E21B 21/066 |
| 2019/0093468 | A1 | * | 3/2019 | Aguirre ................. E21B 21/065 |
| 2020/0232290 | A1 | * | 7/2020 | Zazula ................... E21B 21/01 |

OTHER PUBLICATIONS

PCT Application Serial No. PCT/US2019/025314, International Search Report, dated Jul. 17, 2019, 3 pages.
PCT Application Serial No. PCT/US2019/025314, International Written Opinion, dated Jul. 17, 2019, 6 pages.

* cited by examiner

DOWNHOLE CUTTINGS COLLECTOR

BACKGROUND

The disclosure generally relates to the field of hydrocarbon drilling operations, and more particularly to systems and methods for collecting of cuttings during hydrocarbon drilling operations.

During a downhole operation, fluid being pumped into and out of a borehole can carry cutting samples of formation rock to the surface. These cutting samples can include cutting samples that were unintentionally broken off during the downhole operation or purposely milled away during the downhole operation. Increasing the effectiveness of downhole operations such as pumping, sweeping, drilling operations, fracturing operations, etc. can reduce the cost of hydrocarbon recovery operations.

BRIEF DESCRIPTION OF THE DRAWINGS

Embodiments of the disclosure may be better understood by referencing the accompanying drawings.

DESCRIPTION

The description that follows includes example systems, methods, techniques, and program flows that embody aspects of the disclosure. However, it is understood that this disclosure may be practiced without these specific details. For instance, this disclosure refers to drilling and fracturing operations for downhole particle analysis. Aspects of this disclosure can be also applied to any other applications that return downhole particles to the surface. In other instances, well-known instruction instances, structures and techniques have not been shown in detail in order not to obfuscate the description.

Various embodiments relate to a system and related methods for collecting cutting samples ("cuttings") from a borehole during various downhole operations. By observing characteristics of cuttings during a downhole operation, the effectiveness of such downhole operations can be increased. In some embodiments, the system includes a pump and a suction line that can be in fluid communication with a fluid carrying cuttings from the borehole during a downhole operation. The pump and suction line can be in fluid communication with the fluid by connecting with a fluid flow line and/or a fluid holding tank. This system can then operate to extract fluid containing cuttings from a borehole, the cuttings produced by drilling operations, fracturing operations, etc. The system can then operate to deposit the cuttings onto a separation screen to separate a liquid portion of the fluid from the cuttings. The separated liquid can then be returned to a fluid repository for reuse downhole to remove additional cuttings.

The separated cuttings can be washed with a wash fluid and/or marked with a reference to depth of return, time, or some other form of identification to associate where the cuttings originated in the borehole. In some embodiments, imaging devices can capture images of the cuttings to allow visual analysis at the downhole operation site or a remote site. The imaging device used to acquire images of the cuttings can include one or more cameras such as a normal focus camera or a highly-magnified focus camera that can capture images under a variety of lighting, such as white light and/or ultraviolet light. Alternatively, or in addition, the images can be used to identify the cuttings by their corresponding markings, correlating the cuttings to a depth and/or time, determining formation properties by the color of the cuttings, etc.

After acquiring the images or performing analytical operations based on the images, the system can then transport the cuttings for placement into a cuttings container of a specified size, shape and/or material. In some embodiments, the specified cuttings container can be selected based on the volume and density of the cuttings therein. The system can also include a cover device that can secure a cuttings container using lid or other cover to prevent spilling or escape of any fluid or gas from the cuttings container.

The collected cuttings can be gathered and labeled based on results from analytical operations. These cuttings containers can be packaged for shipment with labels on one or more individual containers identifying situational attributes (such as the name of the drilling site, customer name, depth range, number of cuttings containers, etc.). In some embodiments, the cuttings can also be ground or otherwise reduced in size by a cuttings grinder. Furthermore, the grinder or another module can tamp down or otherwise densely pack the ground cuttings in a bar-coded or labelled crucible for analysis. The analysis on the ground cuttings can be performed using an analysis module that includes equipment for performing microscopy, X-Ray fluorescence (XRF), X-Ray diffraction (XRD), pyrolysis, etc.

Using the system and methods described above, information collected during various downhole operations such as drilling, fracturing, etc. can be made more accurate. The systems and methods described in this application can accurately assist in organization and arrangement of the cuttings collection process, including origination, preparation, and disposition. Additionally, various embodiments can increase consistency in the quality of the cuttings collected, which can improve the analytical precision of cuttings-based analysis of the borehole.

Example Systems for Collection of Downhole Cuttings

Figure 1:
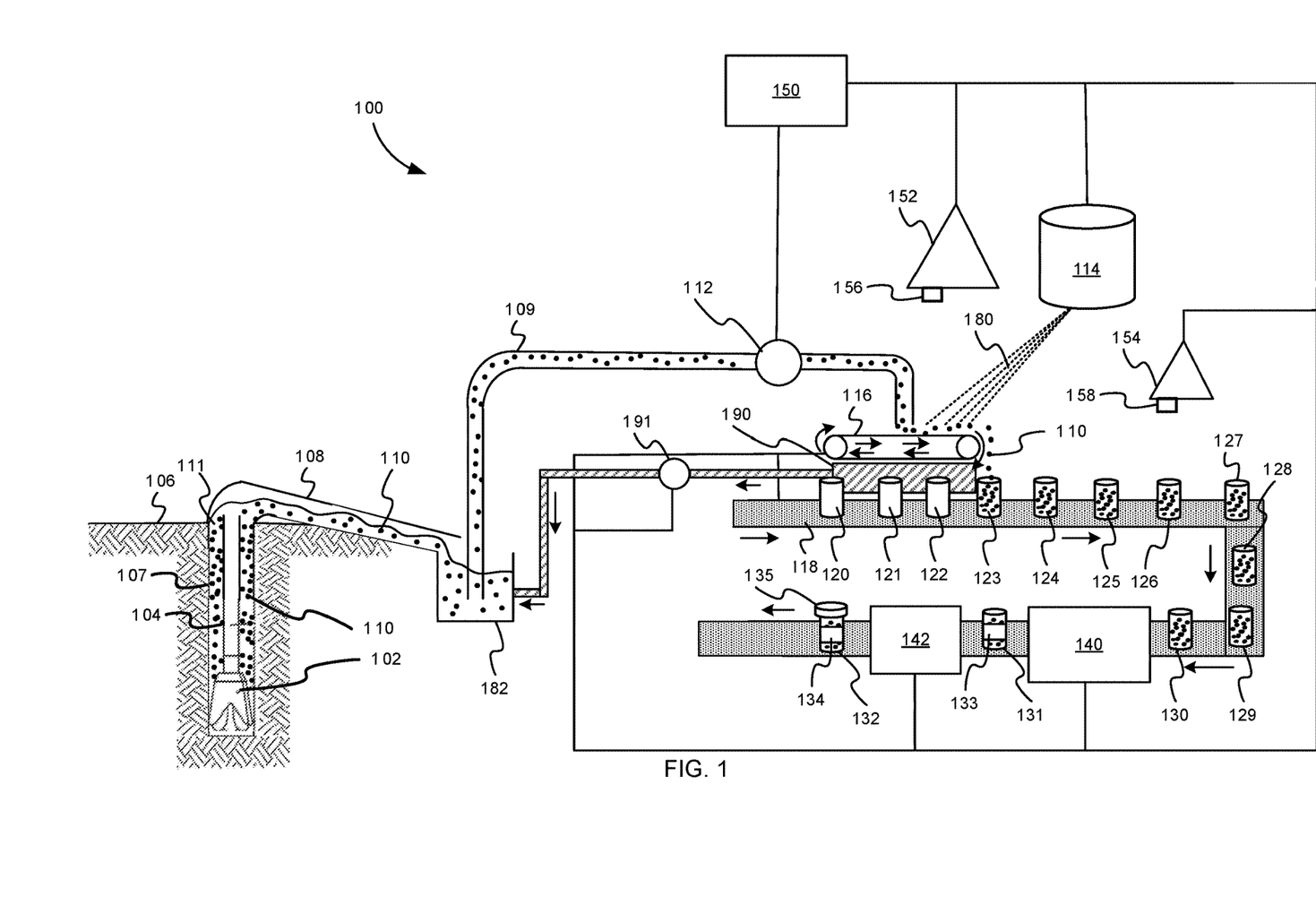
FIG. 1 is a schematic diagram of a first example system for the collection of downhole cuttings.

FIG. 1 is a schematic diagram of a first example system for the collection of downhole cuttings. A system 100 of FIG. 1 can be part of a downhole drilling operation to collect downhole cuttings while a borehole 107 is being drilled into a formation using a drill string 104 that includes a drill bit 102. During the drilling operation, drilling fluid 111 (also known as "drilling mud" or "mud" by those of ordinary skill in the art) is pumped downhole through the drill string 104. As the flow of drilling fluid 111 exits the bit 102, and drilling continues, cuttings 110 may enter the drilling fluid 111, so that the combination of drilling fluid 111 and cuttings 110 can be returned to the surface 106 of the borehole 107.

The system 100 can include a computer 150 for controlling the collection of the downhole cuttings 110. The computer 150 is coupled to a cuttings separation conveyor 116, a container assembly conveyor 118 under the cuttings separation conveyor 116, a flow line pump 112, imaging devices 156-158, sources of illumination 152-154, a return pump 191, a cover device 142, and a content label device 140. Although not shown, the computer 150 is also coupled to the drill string 104 to control drilling operations, monitor the rate of penetration, the depth of penetration, etc.

As described herein, operations of the system 100 can be selectively activated to capture a portion of the cuttings 110 from downhole. For example, the system 100 can be activated to collect downhole cuttings once a certain depth of the borehole 107 has been reached during the drilling operations.

A first flow line 108 receives the flow at the surface 106 and transmits the flow of drilling fluid 111 with cuttings 110 to a holding tank 182. In some embodiments, the holding tank 182 can be known as a "possum belly" or "flow line trap." The flow line pump 112 is coupled to a first end of a suction line 109. The second end of the suction line 109 is positioned in the holding tank 182. In operation, the flow line pump 112 pumps the flow of drilling fluid 111 and cuttings 110 in the holding tank 182 onto a surface of the cuttings separation conveyor 116. The cuttings separation conveyor 116 includes a separation screen that allows the liquid in the flow to pass through to be captured by a catch basin 190, while allowing the solid cuttings 110 to remain. For example, the separation screen can be a mesh screen.

During operation, the cuttings separation conveyor 116 rotates such that the solid cuttings 110 fall off the side of the cuttings separation conveyor 116 into one of a number of cuttings containers 120-132 positioned under the cuttings separation conveyor 116 at the edge of the cuttings separation conveyor 116. For example, the cuttings container 123 is positioned at the edge of the cuttings separation conveyor 116 to receive a portion of the cuttings 110 from the cuttings separation conveyor 116. A return pump 191 can operate to pump the liquid from the catch basin 190 back into the holding tank 182.

The system 100 also includes the container assembly conveyor 118 that moves the cuttings containers 120-132 in a line for assembly. The assembly process can include filling individual cuttings containers 120-132 with a portion of the cuttings 110. The assembly process can also include adding one or more content labels such as labels 133-134 to each of the cuttings containers, wherein the content labels can include information corresponding to various situational attributes and/or characteristics of the portion of the cuttings 110 contained in the cuttings container using a content label device 140. The assembly process can also include securing the cuttings container by adding a cover (e.g., a lid) to the cuttings containers 120-134.

The system 100 can also include sources of illumination 152-154, such as white light, ultraviolet light, etc. The source of illumination 152 can illuminate cuttings 110 on the surface of the cuttings separation conveyor 116. The source of illumination 154 can illuminate the portion of the cuttings 110 that have been deposited in a cuttings container.

The system 100 can include the imaging devices 156-158. The imaging device 156 can capture images of cuttings 110 as they move across the cuttings separation conveyor 116. The imaging device 158 can capture images of the portion of the cuttings 110 deposited in an individual cuttings container. In some embodiments, the imaging devices 156-158 can comprise one or more charge coupled device (CCD) cameras, including low light or infrared cameras. The imaging devices 156-158 can be connected to the computer 150 to store images captured by the imaging devices 156-158. The computer 150 may use a three-dimensional (3D) pattern recognition program or particle size analysis program to measure and determine characteristics of the cuttings 110, such as size, volume, shape, etc. In some embodiments, either or both the imaging devices 156-158 can include one or more microscopy imaging equipment. For example, the imaging device 158 can include a magnifying camera and a multispectral imaging device that can record light waves outside the visible spectral range of light.

The system 100 can also include the wash fluid tank 114. During activation, the computer 150 can cause wash fluid 180 to be sprayed onto the surface of the cuttings separation conveyor 116 from an output of the wash fluid tank 114 to clean the cuttings.

As noted previously, the system 100 can also include the content label device 140 that is positioned to receive a cuttings container that has been filled with cuttings along the container assembly conveyor 118. As shown in FIG. 1, the container assembly conveyor 118 can be under the cuttings separation conveyor 116 at the edge of the cuttings separation conveyor 116. The computer 150 can transmit the situational attributes of some portion of the cuttings 110 previously determined by the computer 150 to the content label device 140 while a cuttings container is being filled with that same portion of the cuttings 110.

For example, the computer 150 can transmit the situational attributes to the content label device 140 while the cuttings container 223 is being filled at a position below the cuttings separation conveyor 116. The situation attributes can include information about the portion of the cuttings 110 that are used to fill the container 223, such as a name of the drilling site, a customer name, a depth range, a number of cuttings containers, etc. The content label device 140 can print a label with these situational attributes and attach the label to an individual cuttings container. For example, after the container assembly conveyor 118 advances to a next position, the cuttings container 130 can be labeled with a label by the by the content label device 140. As shown in FIG. 1, the cuttings container 131 is positioned along the container assembly conveyor 118 after the content label device 140 attached a label 133 to the cuttings container 131, wherein the label 133 includes situational attributes corresponding to the portions of the cuttings 110 in the cuttings container 131.

The system 100 also includes the cover device 142 that is positioned to receive a cuttings container that has been filled with cuttings along the container assembly conveyor 118. The cover device 142 can attach and secure a cover to the top of an individual cuttings container to prevent spilling or escape of any fluid, gas, or solids from the cuttings container. For example, as shown in FIG. 1, after the container assembly conveyor 118 advances, the cuttings container 131 can be covered by the cover device 142. As an additional example, the cuttings container 132 is positioned along the container assembly conveyor 118 after the cover device 142 attaches and secures a cover 135 to the top of the cuttings container 132.

Figure 2:
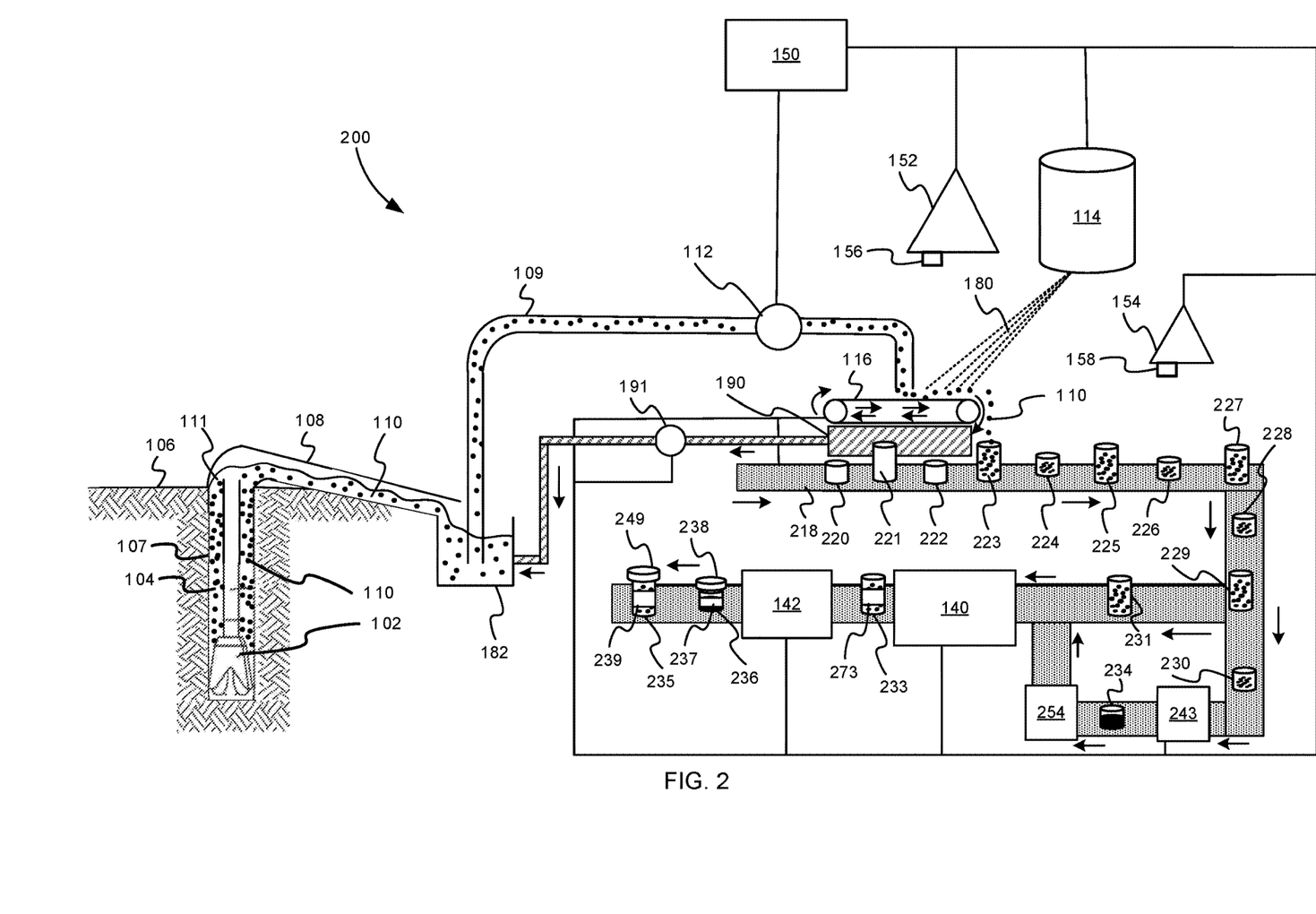
FIG. 2 is a schematic diagram of a second example system for the collection of downhole cuttings.

FIG. 2 is a schematic diagram of a second example system for the collection of downhole cuttings. In contrast to the system 100 of FIG. 1, a system 200 of FIG. 2 includes operations to divert a portion of washed and dried cuttings into ground cuttings containers. These samples of diverted cuttings can be ground into a powder which can then be tamped down to form a crucible for the cuttings sample. The crucible can be useful for analysis of the cuttings, including techniques such as microscopy, XRF, XRD, pyrolysis, etc.

The system 200 includes similar components to those in the system 100. Specifically, a system 200 of FIG. 2 can be part of a drilling operation to collect downhole cuttings during drilling of a borehole 107 being drilled into a formation using a drill string 104 that includes a drill bit 102. During the drilling operation, drilling fluid 111 is pumped downhole through the drill string 104. The flow thereafter can include drilling fluid 111 that carries cuttings 110 to be returned to the surface 106 of the borehole 107.

The system 200 can include a computer 150 for controlling collection of the downhole cuttings 110. The computer 150 is coupled to a cuttings separation conveyor 116, a container assembly conveyor 118, a flow line pump 112, imaging devices 156-158, sources of illumination 152-154, a return pump 191, a cover device 142, and a content label device 140. Although not shown, the computer 150 is also coupled to the drill string 104 to control the drilling operation, monitor rate of penetration, depth of penetration, etc. As described herein, operations of the system 200 can be selectively activated to capture a portion of the cuttings 110 generated by downhole drilling operations. For example, the system 200 can be activated to collect downhole cuttings once a certain depth of the borehole 107 has been reached during the drilling operation.

A first flow line 108 receives the flow of drilling fluid 111 and cuttings 110 at the surface 106 and transmits the flow to a holding tank 182. The flow line pump 112 can move the drilling fluid 111 and cuttings 110 in the holding tank 182 onto a surface of the cuttings separation conveyor 116 via the suction line 109 connected to the holding tank 182.

The cuttings separation conveyor 116 includes a separation screen (not shown) that allows the liquid to pass through the screen to be captured by a catch basin 190, while allowing the solid cuttings 110 to remain. The cuttings separation conveyor 116 rotates such that the solid cuttings 110 fall off the side of the cuttings separation conveyor 116 into one of a number of cuttings containers 220-236 positioned under the edge of the cuttings separation conveyor 116. A return pump 191 can pump the liquid from the catch basin 190 back into the holding tank 182.

The system 200 can include sources of illumination 152-154 to illuminate cuttings 110 on the surface of the cuttings separation conveyor 116 or in a cuttings container. The system 200 can also include the imaging devices 156-158 to capture images of cuttings 110 as they move across the cuttings separation conveyor 116 or images of a portion of the cuttings 110 in the cuttings container. The imaging devices 156-158 can be connected to the computer 150 to store images captured by the imaging devices 156-158. In addition, the computer 150 can cause an output on a wash fluid tank 114 to spray wash fluid 180 onto the surface of the cuttings separation conveyor 116, wherein the imaging devices 156-158 can capture images of the cuttings 110 before, during, and/or after the cuttings 110 are sprayed with the wash fluid 180.

The system 200 includes a container assembly conveyor 218 that moves cuttings containers 220-236. The cuttings containers 220-236 include unground cuttings containers 221, 223, 225, 227, 229, 231, 233, and 235 and ground cuttings containers 220, 222, 224, 226, 228, 230, 234, and 236. The container assembly conveyor 218 can also include a conveyor belt path that moves the ground cuttings containers 220, 222, 224, 226, 228, 230, 234, and 236 to a grinder 243 for analysis by an analysis module 254. The grinder 243 can grind cuttings 110 into smaller pieces, for deposit into the ground cuttings containers 220, 222, 224, 226, 228, 230, 234, and 236 to ground cuttings. The analysis module 254 can analyze the smaller pieces using one or more analysis methods such as XRF, XRD, pyrolysis, etc. In this example, the ground cuttings containers 220, 222, 224, 226, 228, 230, 234, and 236 and the unground cutting containers 221, 223, 225, 227, 229, 231, 233, and 235 can be interspersed along at least a portion of the container assembly conveyor 218.

The container assembly conveyor 218 includes a separate path for the ground cuttings containers 220, 222, 224, 226, 228, 230, 234, and 236 so that the grinder 243 can receive them and grind selected portions of the cuttings 110 contained therein into smaller pieces. The ground cuttings can be smaller than the cuttings 110 on the cuttings separation conveyor 116 and can be shaped in various ways, in a variety of sizes, such as pebbles, grains, powder, etc. The grinder 243 can include various grinding and/or crushing elements such as a metal cone crusher, gyratory crushers, etc. The grinder 243 can also operate to tamp down the powder in each of the ground cuttings containers 220, 222, 224, 226, 228, 230, 234, and 236. The quantity of ground cuttings in a ground cuttings container can be less than five grams, between five and twenty grams, or more than twenty grams.

As shown in FIG. 2, once processed by the grinder 243, the samples in the ground cuttings containers can be analyzed using the analysis module 254. For example, the analysis module 254 can include X-ray equipment for performing XRD analysis of a powdered sample generated by the grinder 243. Alternatively, or in addition, the analysis module can include equipment to perform other analysis, such as additional microscopy, XRF, pyrolysis, etc.

The system 200 can also include the content label device 140 that is positioned to receive a cuttings container that has been filled with some portion of the cuttings 110 along the container assembly conveyor 218 based on situational attributes determined by the computer 150. The content label device 140 can print a label with these situational attributes and attach the label to the cuttings container, and further include information based on whether the sample inside the cuttings container includes ground cuttings. For example, as shown in FIG. 2, the unground cuttings container 233 is labeled with a label 273 using the content label device 140. The label 273 includes situational attributes corresponding to the portions of the cuttings 110 in the unground cuttings container 233 as well as an indicator that represents the cuttings in the unground cuttings container 233 as not ground cuttings. In addition, and similar to the system 100 shown in FIG. 1, the system 200 can include a cover device that secures either the unground cuttings containers or ground cuttings containers by adding a cover to the containers 220-236 using the cover device 142. For example, the cover device can add a cover 238 to the ground cuttings container 236 having a label 237 or add a cover 249 to an unground cuttings container 235 having a label 239.

FIGS. 1-2 depict example systems 100, 200 with example positions for assembling the containers along either the container assembly conveyor 118 or the container assembly conveyor 218. Other embodiments can include systems where the positions for assembly are reordered. For example, the cover device 142 can be positioned before the content label device 140. In another example, the content label device 142 can be positioned before the containers are filled. Additionally, other systems can include one or more additional modules that can divert a quantity of the cuttings from the separation system to a device which can grind samples into a powder before washing and/or drying the cuttings. In some embodiments, the diversion, washing, grinding and/or tamping processes can be connected to a digital control system, perhaps forming a part of the computer 150. Furthermore, in some embodiments, the system can be portable, and can be easily and quickly set up and taken off a site of downhole operations.

Example Operations

Figure 3:
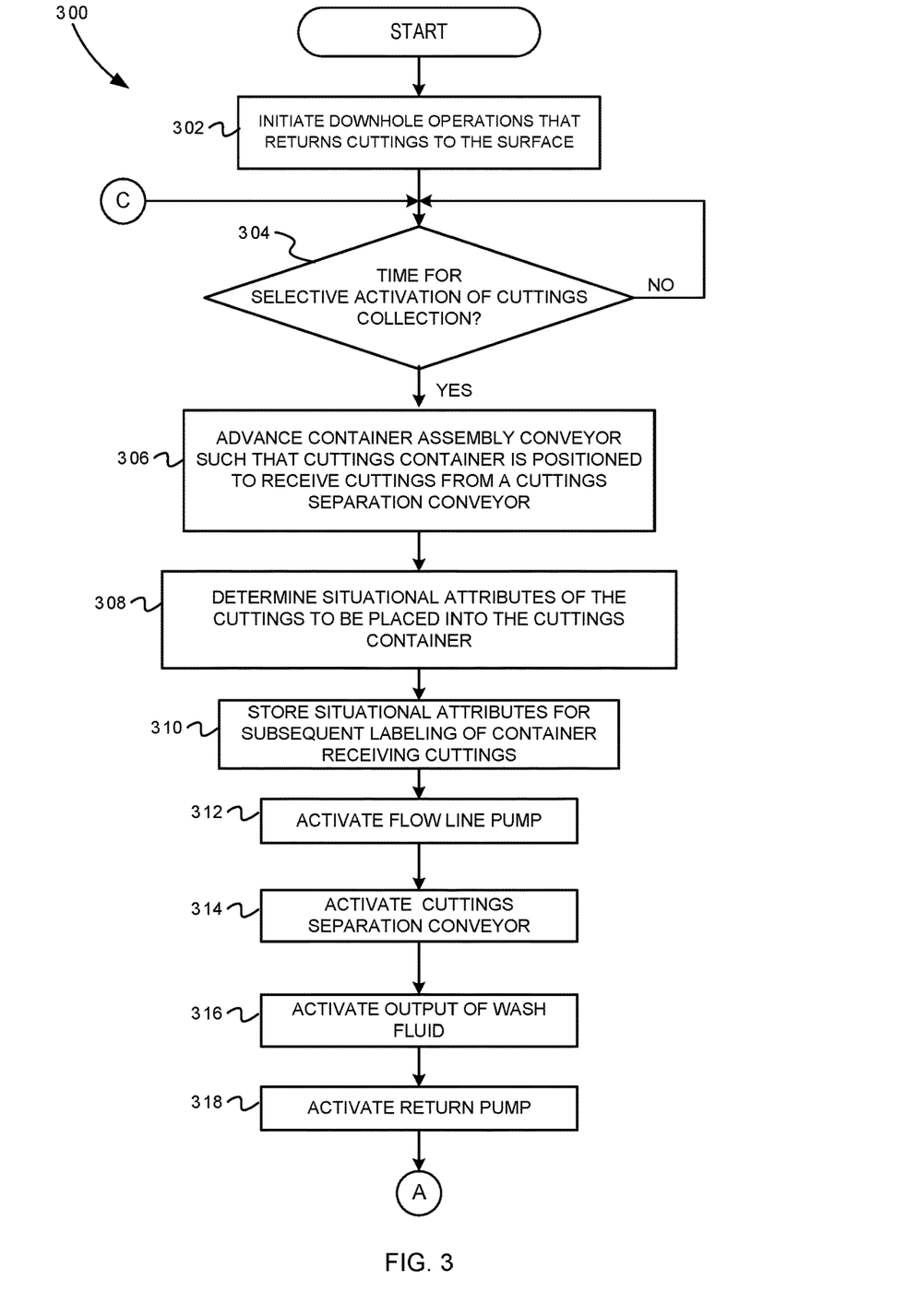
FIGS. 3-5 depict flowcharts of operations for the collection of downhole cuttings.
Figure 4:
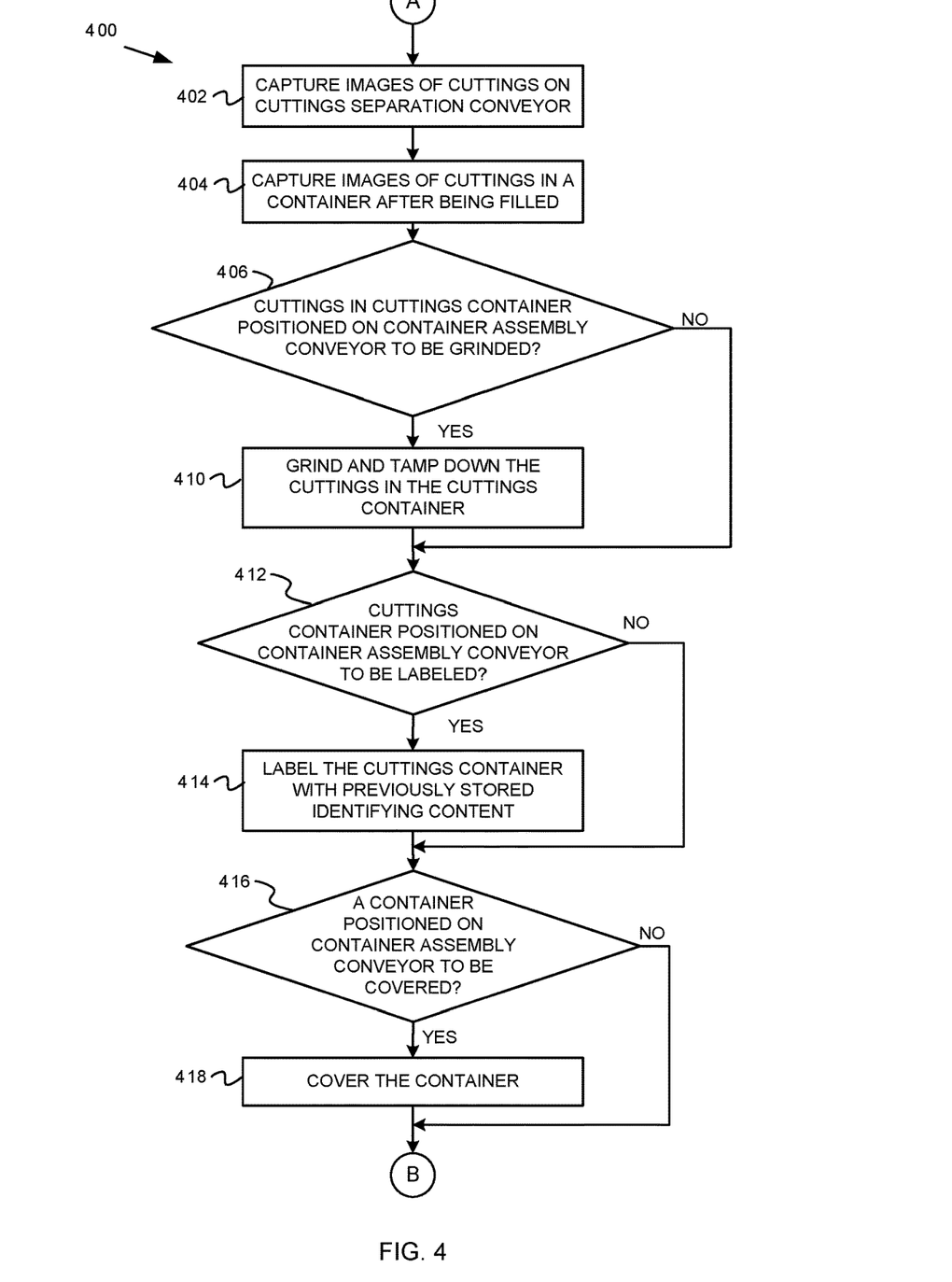
Figure 5:
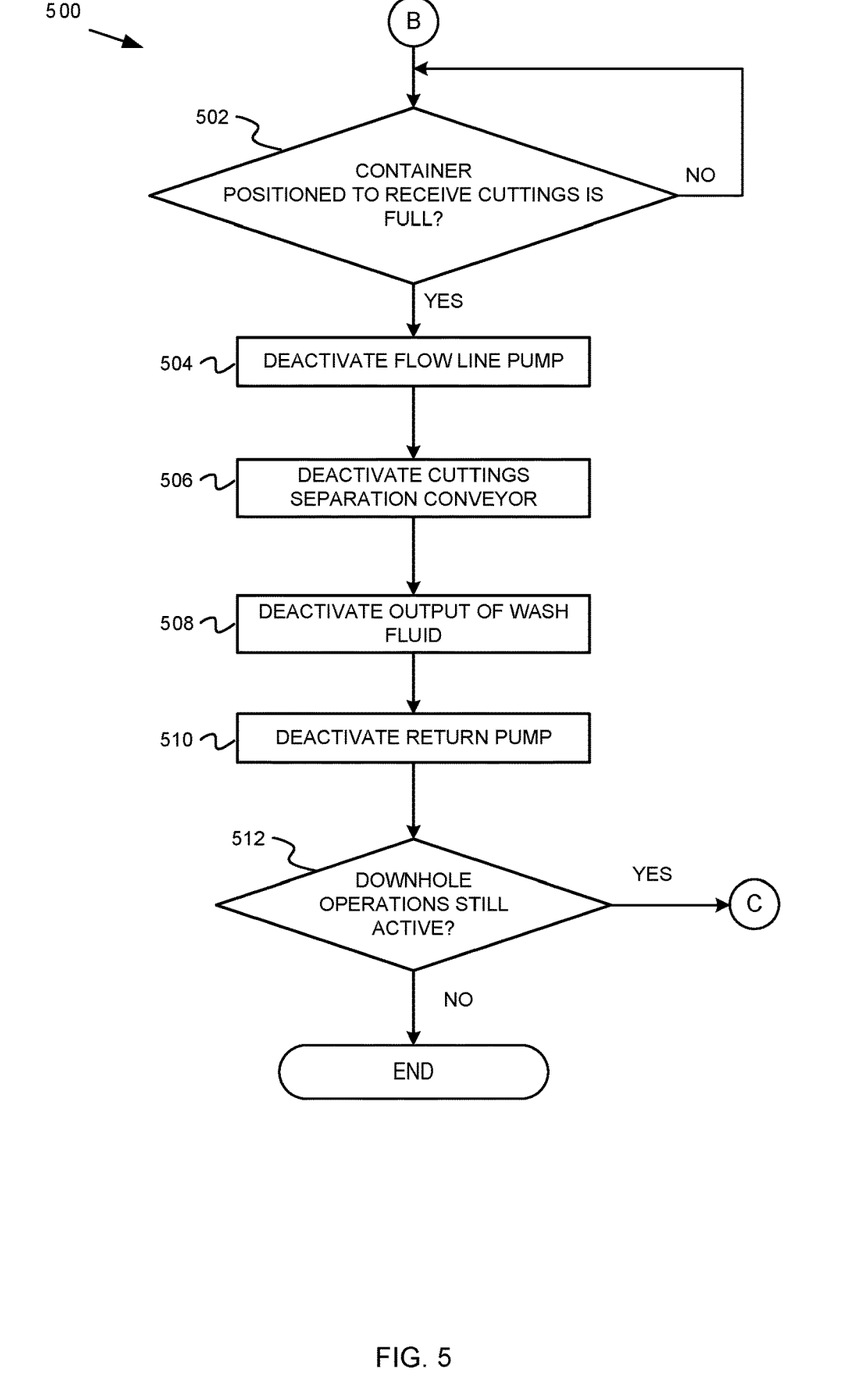

FIGS. 3-5 depict flowcharts of operations for the collection of downhole cuttings, according to some embodiments.

Operations shown in the flowcharts 300-500 of FIGS. 3-5 are connected to each other through transition points A-C. Operations of the flowcharts 300-500 can be performed by software, firmware, hardware or a combination thereof. For example, with reference to FIG. 7 below, operations of the flowchart 300-500 can be performed using a system that includes a computer device 700 as described below and/or the computer 150 shown in FIGS. 1-2. The operations of the flowchart 300 start at block 302.

At block 302, downhole operations are initiated so that cuttings located downhole can be returned to the surface. With reference to FIG. 1, initiating downhole operations can include starting a drilling operation that produces drilling fluid with cuttings 110 pumped from the borehole 107. In some embodiments, initiating downhole operations can include other operations that produce fluid with solid cuttings, such as hydraulic stimulation operations, borehole pumping operations, etc.

At block 304, a determination is made of whether it is time for selective activation of cuttings collection. The system can determine that it is time for selective activation based on detecting that a threshold fluid amount has been pumped from the wellbore. For example, the system can determine that it is time for selective activation after a threshold fluid amount of 505 liters of fluid have been pumped from the wellbore. Alternatively, or in addition, the system can determine that it is time for selective activation after an elapsed operation time has reached a threshold time. For example, the system can determine that it is time for selective activation after drilling operations have been initiated for at least 10 minutes, reaching the threshold time of 10 minutes. If the system determines that it is not time for selective activation, operations of the flowchart 300 can return to block 304. Otherwise, operations of the flowchart can continue to block 306.

At block 306, a container assembly conveyor is advanced such that a cuttings container is positioned to receive cuttings from a cuttings separation conveyor. In some embodiments, the container assembly conveyor can advance a cutting container to a position beneath a cutting separation conveyor at the edge of the cutting separation conveyor. For example, with reference to FIG. 1, the container assembly conveyor 118 can advance the cutting container 223 to a position beneath the cutting separation conveyor 116 at the right edge of the cutting separation conveyor 116.

At block 308, situational attributes of the cuttings to be placed into a cuttings container are determined. In some embodiments, the system can determine the situational attributes based on properties of the cuttings that are stored in the container. For example, the situational attributes can include the time that the cuttings were collected, the depth corresponding to the cutter at the time the cuttings were collected, and a well location name from which the cuttings were collected.

At block 310, situational attributes are stored for subsequent labeling of the container receiving the portion of the cuttings to which the situational attributes correspond. In some embodiments, the corresponding situational attributes can be stored in a data structure such as a data table, an object, etc. on one or more machine-readable media. In some embodiments, situational attributes can be stored and pre-assigned to individual containers. For example, situational attributes can be stored and pre-assigned to a container corresponding with container identifier 001. Alternatively, or in addition, the situational attributes can be stored based on the cuttings in the containers, wherein a container is labelled based on analysis of the cuttings inside of the container. For example, the situational attributes can be assigned to a set of cuttings, and containers that receive a portion of the set of cuttings can be labeled with the situational attributes.

At block 312, the flow line pump is activated. Activating the flow line pump can include generating a pressure difference that moves drilling fluid carrying the cuttings from a flow line or a holding tank containing the fluid into a suction line. In some embodiments, the flow line pump can move drilling fluid from the borehole at a sufficient volumetric flow rate through the suction line such that cuttings are not being left behind or disproportionately held back. When the volumetric flow rate is sustained at this level, the sensitivity of cuttings analysis operations to the presence of solid cuttings in the fluid can be reduced. The flow line pump can move the drilling fluid carrying the cuttings to a surface of a cuttings separation conveyor.

At block 314, the cuttings separation conveyor is activated. The cuttings separation conveyor can include a separation screen on some or all of a conveyor surface, wherein activation of the separation conveyor will move cuttings on the separation conveyor. In some embodiments, as the cuttings are moved by the cuttings separation conveyor, the separation screen can allow liquid such as drilling fluid, mud, formation fluid, etc. to flow through into a catch basin while keeping the cuttings above the separation conveyor. For example, with reference to FIG. 1, activation of the cuttings separation conveyor 116 allows liquid to flow into the catch basin 190 as the cuttings move from left to right along the top surface of the cuttings separation conveyor 116.

At block 316, an output of the wash fluid is activated. In some embodiments, activating the output of wash fluid can include an activating an output attached to a wash fluid tank to spray wash fluid over the cuttings. For example, with reference to FIG. 1, an output from the wash fluid tank 114 can spray wash fluid 180 onto the cuttings 110 on surface of the cuttings separation conveyor 116 to clean the cuttings 110 during the activation of wash fluid output.

At block 318, the return pump is activated. Activation of the return pump can move fluid from a catch basin to a flow line or a fluid holding tank. For example, with reference to FIG. 1, activation of the return pump 191 can move fluid from the catch basin 190 to the holding tank 182. Alternatively, or in addition, the return pump 191 can move fluid from the catch basin 190 to another destination, such as a clean or recycled drilling fluid receptacle. Operations of the flowchart 300 continue at transition point A, which continues at transition point A of the flowchart 400. From transition point A of the flowchart 400, operations continue at block 402.

At block 402, one or more images of cuttings on the cuttings separation conveyor are captured. In some embodiments, the system can capture images of the cuttings on the separations conveyor using a black and white camera. Alternatively, or in addition, the system can capture images of the separations conveyor using a color camera. During image capture, the cuttings can be illuminated with various lighting such as white light, infrared light, ultraviolet light, etc. The images can be analyzed to determine characteristics of the cuttings such as size distribution, cutting geometry, etc. For example, with reference to FIG. 1, the computer 150 can use a 3D pattern recognition program or particle size analysis program to measure and determine characteristics of the cuttings such as size, volume, shape, etc.

At block 404, one or more images of cuttings in a container that has been filled are captured. In some embodiments, the system can capture images of the cuttings in the container using a black and white camera. Alternatively, or in addition, the system can capture images of the separations conveyor using a color camera. During the capture, the cuttings can be illuminated with various lighting such as white light, infrared light, ultraviolet light, etc. The images can be later analyzed to determine size distribution, cutting geometry, and other characteristics of the cuttings.

At block 406, a determination is made of whether cuttings in a cuttings container positioned on the container assembly conveyor are to be ground. In some embodiments, a system can determine that the cuttings container is a ground cuttings container and that the cuttings to be deposited in the ground cuttings container are to be processed using a grinding operation. If the cuttings in the ground cuttings container positioned on the container assembly conveyor are to be ground, operations of the flowchart 400 continue at block 410. Otherwise, operations of the flowchart 400 continue at block 412.

At block 410, the cuttings in the cuttings container are ground and tamped down. In some embodiments, grinding down cuttings in a cuttings container can include the use of a rock crusher to reduce the cuttings to a powder. For example, with reference to FIG. 2, the grinder 243 can be used to reduce the cuttings 110 in one or more of the ground cuttings containers 220, 222, 224, 226, 228, 230, 234, and 236 to a powder.

At block 412, a determination is made as to whether a cuttings container positioned on the container assembly conveyor is to be labeled. In some embodiments, a determination can be made that the container is to be labeled based on whether situational attributes corresponding to the container or cuttings in the container are available. For example, with reference to FIG. 1, a determination can be made that the container 123 is to be labeled if situational attributes corresponding to the container 123 or the cuttings 110 deposited in the container 123 are stored and/or otherwise available. If there is a container positioned on the container assembly conveyor to be labeled, operations of the flowchart 400 continue at block 414. Otherwise, operations of the flowchart 400 continue at block 416.

At block 414, the container is labeled with previously stored identifying content. In some embodiments, the identifying content can include situational attributes and/or characteristics of the cuttings in the container. A label containing the identifying content can be applied with an adhesive. Alternatively, the label can be applied onto the container using other methods such as mechanical etching or laser-printing. In some embodiments, the label can be converted into one-dimensional barcode or two-dimensional barcode before being applied onto the container.

In some embodiments, the label can contain additional information based on analysis results acquired from additional modules in communication with the system. Additional modules can analyze and identify cuttings in images of the washed cuttings. For example, the system can visually identify the washed cuttings and can also determine characteristics of the cuttings (such as color, size, shape, hardness, density, mineral composition, etc.). Determination of characteristics of the cuttings can be performed under both white light and ultraviolet light to enable easier identification of cuttings characteristics such as oil staining of the rocks.

Alternatively, or in addition, additional system modules can include one or more components to perform analytical operations such as XRF, XRD, pyrolysis, etc. In some embodiments, other analytical operations of the cuttings can include use of a high-quality microscope capable of determining particle type, size, shape, potential two-dimensional (2D) porosity, etc. The system can also employ a sub-system such as XRF to determine elemental composition of the cuttings. Any of these analytical operations can use Artificial Intelligence (AI) and/or machine learning techniques (such as pattern recognition, learning based on historical information, etc.). In some embodiments, these analytical operations can be performed remotely, or directly at the drilling site.

At block 416, a determination is made as to whether a container positioned on the container assembly conveyor is to be covered. In some embodiments, whether the container positioned on the on the container assembly conveyor is to be covered is based on the value of a preset boolean value. For example, a variable "toBeCovered" can be "true", which can result in the determination that the container is to be covered. If the variable has any other value, the container will not be covered. If there is a container positioned on the container assembly conveyor to be covered, operations of the flowchart 400 continue at block 418. Otherwise, operations of the flowchart 400 continue at transition point B.

At block 418, the container is covered. Covering the container can include adding a lid onto the container or otherwise sealing the container. For example, with reference to FIG. 1, the system can use a cover device 142 to attach and secure a lid to a top of the container. In some embodiments, the cover device can cover a container with a screw lid by rotating the screw lid onto the container. In other embodiments, the cover device can secure a cover to the container using a sealant, heat treatment, pressure treatment, etc. After the container is covered, the container can be transported to a lab for further analysis. Operations of the flowchart 400 continue at transition point B, which continues at transition point B of the flowchart 500. From transition point B of the flowchart 500, operations continue at block 502.

At block 502, a determination is made as to whether the cuttings container positioned to receive cuttings is full. The system can determine that the cuttings container is full based on an object recognition system, a weight measurement system, or some other system. For example, with reference to FIG. 1, the computer 150 can analyze images of the cuttings container 223 captured by the image device 158 and determine that the cuttings container 223 is full based on an object recognition model. If the container is not full, operations of the flowchart 500 remain at block 502. Otherwise, operations of the flowchart 500 continue to block 504.

At block 504, the flow line pump is deactivated. Deactivating the flow line pump can reduce and/or stop fluid in the wellbore from reaching the surface of the cuttings separation conveyor. For example, with reference to FIG. 1, deactivating the flow line pump 112 can stop the flow of drilling fluid 111 carrying the cuttings 110 from reaching the cuttings separation conveyor 116.

At block 506, the cuttings separation conveyor is deactivated. Deactivating the cuttings separation conveyor can stop the cuttings on the conveyor from being deposited into a cuttings container. The cuttings separation conveyor can be deactivated using an electronic signal to stop the output. Alternatively, or in addition, the cuttings separation conveyor can be deactivated by cutting off the power to a device outputting the wash fluid. For example, with reference to FIG. 1, the computer 150 can deactivate the cuttings separation conveyor 116 using a signal, which prevents cuttings 110 from being deposited into the container 123. In some embodiments, deactivating the cuttings separation conveyor can include activating a braking system that increases the rate of deceleration of cutters.

At block 508, the output of the wash fluid is deactivated. The output of the wash fluid can be deactivated using an electronic signal to stop the output. Alternatively, or in addition, the output of the wash fluid can be deactivated by cutting off the power to an output device spraying the wash fluid. For example, with reference to FIG. 1, the computer 150 can transmit instructions to a pump in an output of the wash fluid tank 114 to stop spraying the wash fluid 180.

At block 510, the return pump is deactivated. The return pump can be deactivated using an electronic signal to stop the output of the return pump. Alternatively, or in addition, the return pump can be deactivated by cutting off the power to the return pump. For example, with reference to FIG. 1, the computer 150 can transmit instructions to shut off power to the return pump 191, which can then stop flow of liquid from the catch basin 190 back to the holding tank 182.

At block 512, a determination is made as to whether the downhole operations are still active. In some embodiments, the downhole operations can be determined to be active if fluid is still being produced from a borehole and can be collected by the suction line. For example, with reference to FIG. 1, the downhole operations can still be active if new cuttings 110 are still being produced from the borehole 107. If downhole operations are still active, operations of the flowchart 500 continue at transition point C, which continues at transition point C of the flowchart 300. From transition point C, operations continue at block 304. If downhole operations are not still active, operations are complete.

Example Drilling Application

Figure 6:
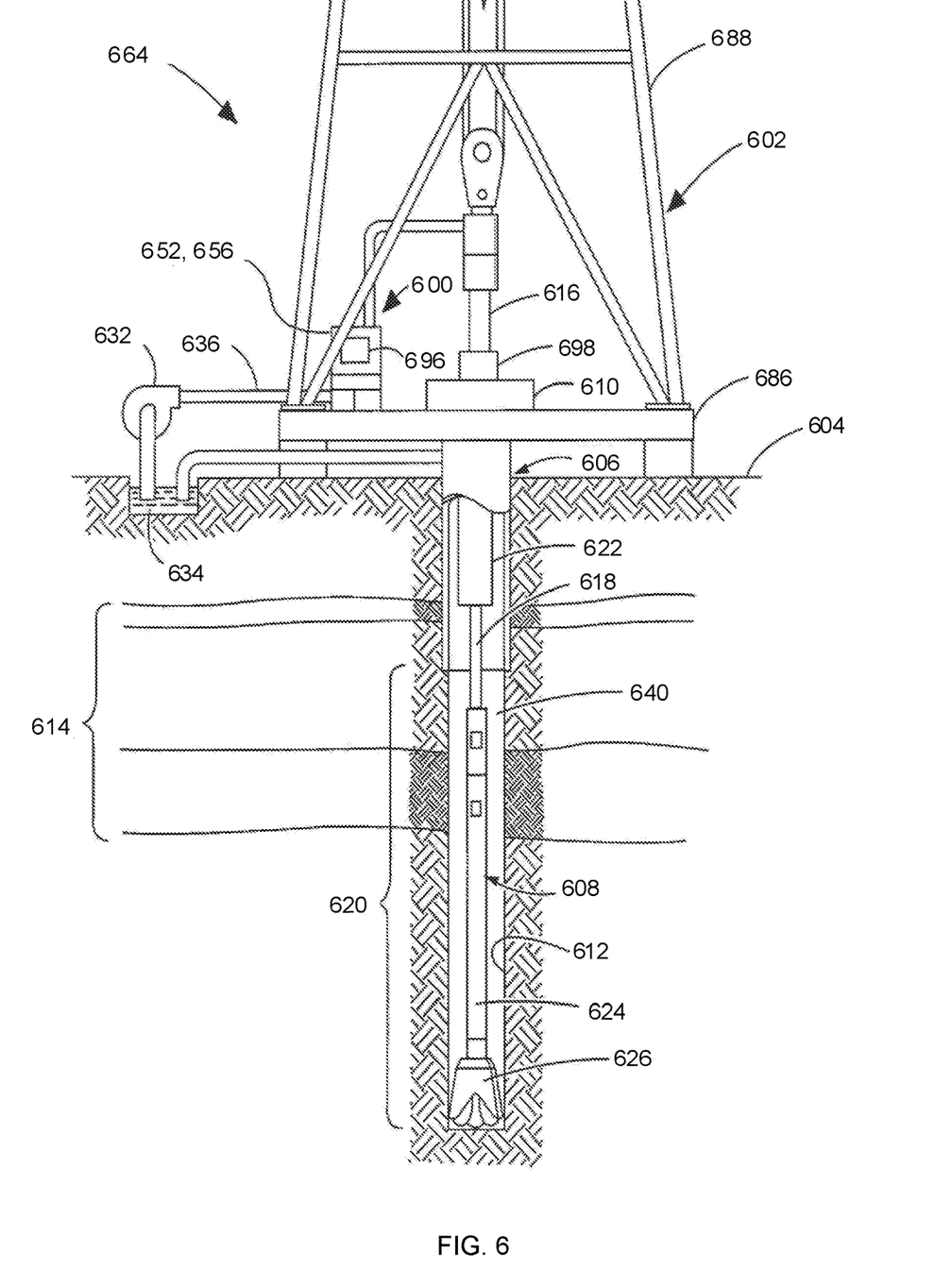
FIG. 6 is a schematic diagram of an onshore drilling system.

FIG. 6 is a schematic diagram of a drilling rig system, according to some embodiments. For example, in FIG. 6 it can be seen how a system 664 may also form a portion of a drilling rig 602 located at the surface 604 of a well 606. Drilling of oil and gas wells is commonly carried out using a string of drill pipes connected together so as to form a drilling string 608 that is lowered through a rotary table 610 into a borehole 612. Here a drilling platform 686 is equipped with a derrick 688 that supports a hoist.

The drilling rig 602 may thus provide support for the drill string 608. The drill string 608 may operate to penetrate the rotary table 610 for drilling the borehole 612 through subsurface formations 614. The drill string 608 may include a Kelly 616, drill pipe 618, and a bottom hole assembly 620, perhaps located at the lower portion of the drill pipe 618.

The bottom hole assembly 620 may include drill collars 622, a down hole tool 624, and a drill bit 626. The drill bit 626 may operate to create a borehole 612 by penetrating the surface 604 and subsurface formations 614. The down hole tool 624 may comprise any of a number of different types of tools including MWD tools, LWD tools, and others.

During drilling operations, the drill string 608 (perhaps including the Kelly 616, the drill pipe 618, and the bottom hole assembly 620) may be rotated by the rotary table 610. In addition to, or alternatively, the bottom hole assembly 620 may also be rotated by a motor (e.g., a mud motor) that is located down hole. The drill collars 622 may be used to add weight to the drill bit 626. The drill collars 622 may also operate to stiffen the bottom hole assembly 620, allowing the bottom hole assembly 620 to transfer the added weight to the drill bit 626, and in turn, to assist the drill bit 626 in penetrating the surface 604 and subsurface formations 614.

During drilling operations, a mud pump 632 may pump drilling fluid from a mud pit 634 through a hose 636 into the drill pipe 618 and down to the drill bit 626. The drilling fluid can flow out from the drill bit 626 and be returned to the surface 604 through an annular area 640 between the drill pipe 618 and the sides of the borehole 612. The drilling fluid may then be returned to the mud pit 634, where such fluid is filtered. In some embodiments, the drilling fluid can be used to cool the drill bit 626, as well as to provide lubrication for the drill bit 626 during drilling operations. Additionally, the drilling fluid may be used to remove subsurface formation 614 cuttings created by operating the drill bit 626. It is the images of these cuttings from the subsurface formations 614 (which are similar to or identical to the cuttings 110 shown in FIGS. 1-2) that many embodiments operate to acquire and process. Thus, it may be seen that in some embodiments, a system 664 may include the systems of FIGS. 1-2 for the collection of downhole cuttings, operating as described previously.

Example Computer

Figure 7:
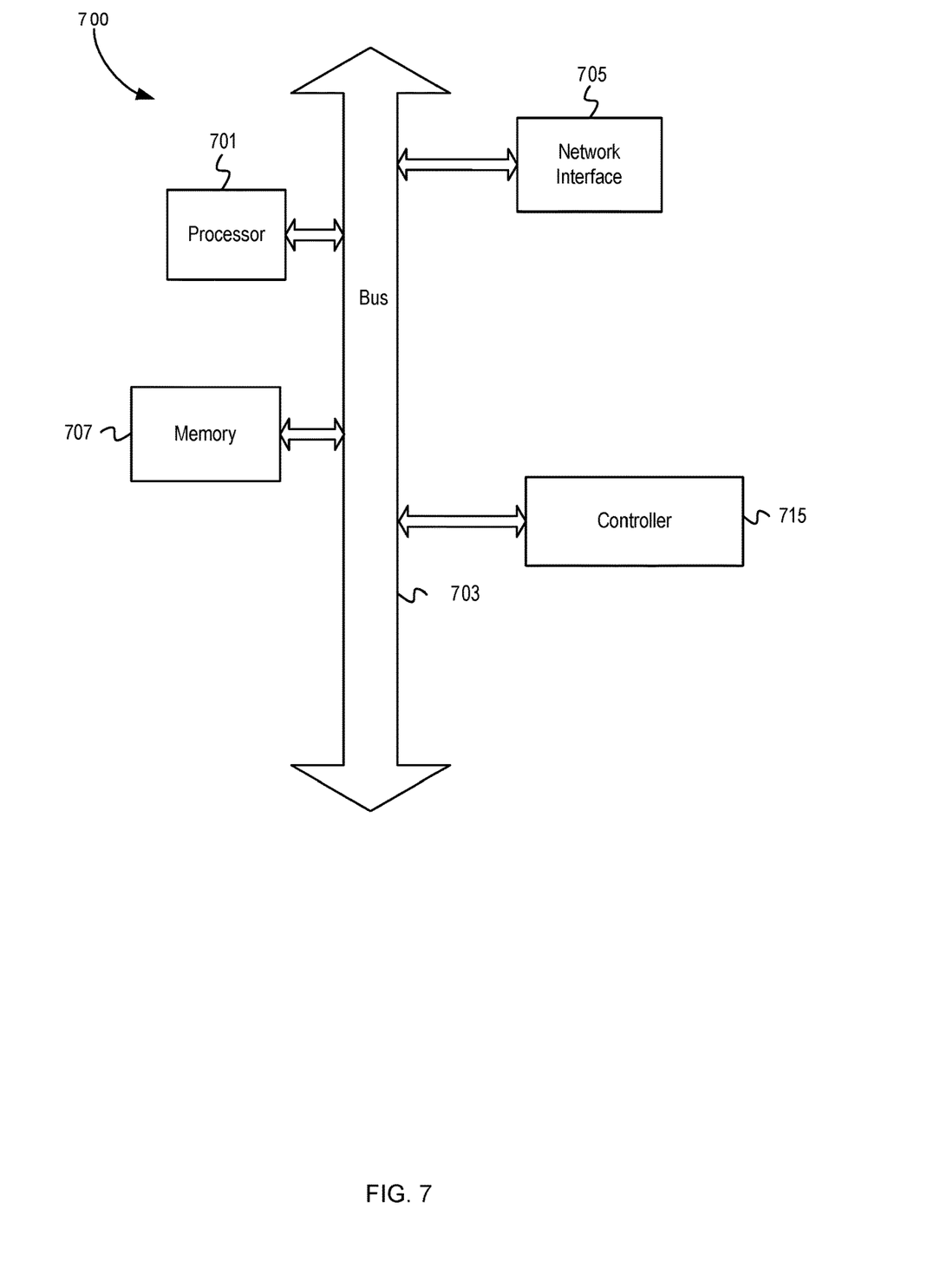
FIG. 7 is an example computer device.

FIG. 7 depicts an example computer, according to some embodiments. The computer includes a processor 701 (possibly including multiple processors, multiple cores, multiple nodes, and/or implementing multi-threading, etc.). The computer includes memory 707. The memory 707 may comprise system memory. Example system memory can include one or more of cache, static random access memory (RAM), dynamic RAM, zero capacitor RAM, Twin Transistor RAM, enhanced dynamic RAM, extended data output RAM, double data rate RAM, electrically erasable programmable read-only memory, nano RAM, resistive RAM, "silicon-oxide-nitride-oxide-silicon memory, parameter RAM, etc., and/or any one or more of the above already described possible realizations of machine-readable media. The computer device 700 also includes a bus 703. The bus 703 can include buses such as Peripheral Component Interconnect (PCI), Industry Standard Architecture (ISA), PCI-Express, HyperTransport® bus, InfiniBand® bus, NuBus, etc. The computer device 700 can also include a network interface 705 (e.g., a Fiber Channel interface, an Ethernet interface, an internet small computer system interface, synchronous optical networking interface, wireless interface, etc.).

The computer also includes a controller 715. The controller 715 can control the different operations that can occur in the response to results from the analysis. For example, the controller 715 can perform any of the operations described above with respect to FIGS. 1-6, regarding the collection of downhole cuttings. Any one of the previously described functionalities may be partially (or entirely) implemented in hardware and/or on the processor 701. For example, the functionality may be implemented with an application specific integrated circuit, in logic implemented in the processor 701, in a co-processor on a peripheral device or card, etc. Further, realizations may include fewer or additional components not illustrated in FIG. 7 (e.g., video cards, audio cards, additional network interfaces, peripheral devices, etc.). The processor 701 and the network interface 705 are coupled to the bus 703. Although illustrated as being coupled to the bus 703, the memory 707 may be coupled to the processor 701.

It will be understood that each block of the flowchart illustrations and/or block diagrams, and combinations of blocks in the flowchart illustrations and/or block diagrams, can be implemented by program code. The program code may be provided to a processor of a general purpose computer, special purpose computer, or other programmable machine or apparatus.

As will be appreciated, aspects of the disclosure may be embodied as a system, method or program code/instructions stored in one or more machine-readable media. Accordingly, aspects may take the form of hardware, software (including firmware, resident software, micro-code, etc.), or a combination of software and hardware aspects that may all generally be referred to herein as a "circuit," "module" or "system." The functionality presented as individual modules/units in the example illustrations can be organized differently in accordance with any one of platform (operating system and/or hardware), application ecosystem, interfaces, programmer preferences, programming language, administrator preferences, etc.

Any combination of one or more machine readable medium(s) may be utilized. The machine-readable medium may be a machine-readable signal medium or a machine-readable storage medium. A machine-readable storage medium may be, for example, but not limited to, a system, apparatus, or device, that employs any one of or combination of electronic, magnetic, optical, electromagnetic, infrared, or semiconductor technology to store program code. More specific examples (a non-exhaustive list) of the machine-readable storage medium can include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a machine-readable storage medium may be any tangible medium that can contain, or store a program for use by or in connection with an instruction execution system, apparatus, or device. A machine-readable storage medium is not a machine-readable signal medium.

A machine-readable signal medium may include a propagated data signal with machine readable program code embodied therein, for example, in baseband or as part of a carrier wave. Such a propagated signal may take any of a variety of forms, including, but not limited to, electromagnetic, optical, or any suitable combination thereof. A machine-readable signal medium may be any machine-readable medium that is not a machine-readable storage medium and that can communicate, propagate, or transport a program for use by or in connection with an instruction execution system, apparatus, or device.

Program code embodied on a machine-readable medium may be transmitted using any appropriate medium, including but not limited to wireless, wireline, optical fiber cable, RF, etc., or any suitable combination of the foregoing.

Computer program code for carrying out operations for aspects of the disclosure may be written in any combination of one or more programming languages, including an object oriented programming language such as the Java® programming language, C++ or the like; a dynamic programming language such as Python; a scripting language such as Perl programming language or PowerShell script language; and conventional procedural programming languages, such as the "C" programming language or similar programming languages. The program code may execute entirely on a stand-alone machine, may execute in a distributed manner across multiple machines, and may execute on one machine while providing results and or accepting input on another machine.

The program code/instructions may also be stored in a machine-readable medium that can direct a machine to function in a particular manner, such that the instructions stored in the machine-readable medium produce an article of manufacture including instructions which implement the function/act specified in the flowchart and/or block diagram block or blocks.

Using the apparatus, systems, and methods disclosed herein may provide the ability to monitor changes in cuttings, so that the impact of drilling fluid properties and activities in the field can be assessed immediately. This ability may be used to increase efficiency of drilling operations by redirecting pumping and drilling operations in real-time, perhaps as part of a closed-loop control system.

Variations and Terminology

While the aspects of the disclosure are described with reference to various implementations and exploitations, it will be understood that these aspects are illustrative and that the scope of the claims is not limited to them. In general, techniques for processing and analyzing of particles from downhole as described herein may be implemented with facilities consistent with any hardware system or hardware systems. Many variations, modifications, additions, and improvements are possible.

Plural instances may be provided for components, operations or structures described herein as a single instance. Finally, boundaries between various components, operations and data stores are somewhat arbitrary, and particular operations are illustrated in the context of specific illustrative configurations. Other allocations of functionality are envisioned and may fall within the scope of the disclosure. In general, structures and functionality presented as separate components in the example configurations may be implemented as a combined structure or component. Similarly, structures and functionality presented as a single component may be implemented as separate components. These and other variations, modifications, additions, and improvements may fall within the scope of the disclosure.

Use of the phrase "at least one of" preceding a list with the conjunction "and" should not be treated as an exclusive list and should not be construed as a list of categories with one item from each category, unless specifically stated otherwise. A clause that recites "at least one of A, B, and C" can be infringed with only one of the listed items, multiple of the listed items, and one or more of the items in the list and another item not listed. A set of items can have only one item or more than one item. For example, a set of numbers can be used to describe a single number or multiple numbers.

Example Embodiments

Example embodiments include the following:

Embodiment 1: A system comprising: a flow line connected to a fluid, wherein the fluid is to carry cuttings from a borehole; a suction line in fluid communication with the flow line; a flow line pump to move fluid via the suction line onto a surface of a cuttings separation conveyor, wherein the surface of the cuttings separation conveyor comprises a separation screen; and a cuttings container positioned under an edge of the cuttings separation conveyor.

Embodiment 2: The system of Embodiment 1, further comprising a container assembly conveyor, wherein at least a portion of the container assembly conveyor is located under an edge of the cuttings separation conveyor.

Embodiment 3: The system of Embodiments 1 or 2, further comprising an imaging device directed to capture an image of the cuttings separation conveyor.

Embodiment 4: The system of any of Embodiments 1-3, further comprising a grinder to grind the cuttings in the cuttings container.

Embodiment 5: The system of any of Embodiments 1-4, further comprising: a catch basin below the separation screen; and a return pump in fluid communication with the catch basin, the return pump to move a fluid in the catch basin away from the catch basin.

Embodiment 6: The system of any of Embodiments 1-5, further comprising a content label device to generate a label, wherein the label is attached to the cuttings container, and wherein the label comprises one or more written situational attributes.

Embodiment 7: The system of any of Embodiments 1-6, further comprising: a wash fluid tank containing wash fluid; and a wash fluid tank output, wherein the wash fluid tank output is to direct wash fluid onto the cuttings on the cuttings separation conveyor.

Embodiment 8: A method comprising: activating a flow line pump to move a fluid comprising cuttings from a borehole onto a surface of a cuttings separation conveyor, wherein the surface of the cuttings separation conveyor comprises a separation screen; and activating a container assembly conveyor to position a cuttings container below an edge of the cuttings separation conveyor to receive the cuttings.

Embodiment 9: The method of Embodiment 8, wherein activating a flow line pump comprises: activating the flow line pump in response to a determination that a depth of penetration into a formation has been reached.

Embodiment 10: The method of Embodiments 8 or 9, further comprising spraying wash fluid onto the surface of the cuttings separation conveyor.

Embodiment 11: The method of any of Embodiments 8-10, further comprising: acquiring images of the cuttings using an imaging device; and measuring a characteristic of the of the cuttings based on the images of the cuttings.

Embodiment 12: The method of any of Embodiments 8-11, further comprising: determining one or more situational attributes of the cuttings to be collected, wherein the one or more situational attributes comprise at least one of a drilling site name, customer name, depth range and number of containers; and labeling the cuttings container with the one or more situational attributes.

Embodiment 13: The method of any of Embodiments 8-12, further comprising grinding the cuttings in the cuttings container into a powder using a grinder.

Embodiment 14: The method of any of Embodiments 8-13, further comprising: determining whether the cuttings container is full; and deactivating the cuttings separation conveyor in response to the cuttings container being full.

Embodiment 15: One or more non-transitory machine-readable media comprising program code, the program code, when executed, to: activate a flow line pump to move a fluid comprising cuttings from a borehole onto a surface of a cuttings separation conveyor, wherein the surface of the cuttings separation conveyor comprises a separation screen; and activate a container assembly conveyor to position a cuttings container below an edge of the cuttings separation conveyor to receive the cuttings.

Embodiment 16: The machine-readable media of Embodiment 15, wherein the program code to activate a flow line pump comprises program code to: activate the flow line pump in response to a determination that a depth of penetration in in a formation has been reached.

Embodiment 17: The machine-readable media of Embodiments 15 or 16, further comprising program code to spray wash fluid onto the surface of the cuttings separation conveyor.

Embodiment 18: The machine-readable media of any of Embodiments 15-17, further comprising program code to: acquire images of the cuttings using an imaging device; and measure a characteristic of the of the cuttings based on the images of the cuttings.

Embodiment 19: The machine-readable media of any of Embodiments 15-18, further comprising program code to determine situational attributes of the cuttings to be collected, wherein the situational attributes comprise at least one of a drilling site name, customer name, depth range and number of containers.

Embodiment 20: The machine-readable media of any of Embodiments 15-19, wherein the program code further comprises program code to: determine whether the cuttings container is full; and deactivate the cuttings separation conveyor in response to the cuttings container being full.

What is claimed is:

1. A system comprising:
   a flow line to convey a fluid from a borehole, wherein the fluid includes cuttings;
   a suction line in fluid communication with the flow line;
   a flow line pump to move the fluid via the suction line onto a surface of a cuttings separation conveyor to collect the cuttings, wherein the surface of the cuttings separation conveyor comprises a separation screen;
   a cuttings container positioned under an edge of the cuttings separation conveyor;
   a cover device positioned along the cuttings separation conveyor; and
   a computer coupled to the flow line pump, the computer configured to:
   selectively activate the collection of the cuttings based, at least in part, on exceeding a threshold fluid amount or a time threshold;
   determine that the cuttings container is to be covered based on a preset boolean value;
   cover, via the cover device, the cuttings container with a screw lid, wherein the cover device is configured to rotate the screw lid onto the cuttings container;
   determine that the cuttings container is full; and
   based on the determination that the cuttings container is full, temporarily deactivate the flow line pump and the cuttings separation conveyer.

2. The system of claim 1, further comprising a container assembly conveyor, wherein at least a portion of the container assembly conveyor is located under the edge of the cuttings separation conveyor.

3. The system of claim 1, further comprising an imaging device directed to capture an image of the cuttings separation conveyor.

4. The system of claim 1, further comprising a grinder to grind the cuttings in the cuttings container.

5. The system of claim 1, further comprising:
   a catch basin below the separation screen; and
   a return pump in fluid communication with the catch basin, the return pump to move a fluid in the catch basin away from the catch basin.

6. The system of claim 1, further comprising a content label device to generate a label, wherein the label is attached to the cuttings container, and wherein the label comprises one or more written situational attributes.

7. The system of claim 1, further comprising:
   a wash fluid tank containing wash fluid; and
   a wash fluid tank output, wherein the wash fluid tank output is to direct wash fluid onto the cuttings on the cuttings separation conveyor.

8. A method comprising:
   selectively activating, via a computer, a flow line pump to move a fluid comprising cuttings from a borehole onto a surface of a cuttings separation conveyor based, at least in part, on exceeding a threshold fluid amount or a time threshold, and wherein the surface of the cuttings separation conveyor comprises a separation screen;

activating a container assembly conveyor to position a cuttings container below an edge of the cuttings separation conveyor to receive the cuttings;

determining, via the computer, that the cuttings container is to be covered based on a preset boolean value;

covering, via a cover device positioned along the cuttings separation conveyor, the cuttings container with a screw lid, wherein the cover device is configured to rotate the screw lid onto the cuttings container;

determining, via the computer, that the cuttings container is full; and based on the determination that the cuttings container is full, temporarily deactivating, via the computer, the flow line pump and the cuttings separation conveyor.

9. The method of claim 8, wherein selectively activating the flow line pump further comprises:

selectively activating the flow line pump in response to a determination that a depth of penetration into a formation has been reached.

10. The method of claim 8, further comprising spraying wash fluid onto the surface of the cuttings separation conveyor.

11. The method of claim 8, further comprising:

acquiring images of the cuttings using an imaging device; and measuring a characteristic of the cuttings based on the images of the cuttings.

12. The method of claim 8, further comprising:

determining one or more situational attributes of the cuttings to be collected, wherein the one or more situational attributes comprise at least one of a drilling site name, customer name, depth range and number of containers; and labeling the cuttings container with the one or more situational attributes.

13. The method of claim 8, further comprising grinding the cuttings in the cuttings container into a powder using a grinder.

14. One or more non-transitory machine-readable media comprising program code, the program code, when executed, to:

selectively activate a flow line pump to move a fluid comprising cuttings from a borehole onto a surface of a cuttings separation conveyor based, at least in part, on exceeding a threshold fluid amount or a time threshold, and wherein the surface of the cuttings separation conveyor comprises a separation screen;

activate a container assembly conveyor to position a cuttings container below an edge of the cuttings separation conveyor to receive the cuttings;

determine that the cuttings container is to be covered based on a preset boolean value;

cover, via a cover device positioned along the cuttings separation conveyor, the cuttings container with a screw lid, wherein the cover device is configured to rotate the screw lid onto the cuttings container;

determine that the cuttings container is full; and based on the determination that the cuttings container is full, temporarily deactivate the flow line pump and the cuttings separation conveyer.

15. The machine-readable media of claim 14, wherein the program code to selectively activate the flow line pump comprises program code to:

selectively activate the flow line pump in response to a determination that a depth of penetration in in a formation has been reached.

16. The machine-readable media of claim 14, further comprising program code to spray wash fluid onto the surface of the cuttings separation conveyor.

17. The machine-readable media of claim 14, further comprising program code to:

acquire images of the cuttings using an imaging device; and measure a characteristic of the cuttings based on the images of the cuttings.

18. The machine-readable media of claim 14, further comprising program code to determine situational attributes of the cuttings to be collected, wherein the situational attributes comprise at least one of a drilling site name, customer name, depth range and number of containers.

* * * * *